United States Patent [19]

Ono

[11] Patent Number: 4,753,502
[45] Date of Patent: Jun. 28, 1988

[54] HOLOGRAPHIC LASER BEAM SCANNER

[75] Inventor: Yuzo Ono, Tokyo, Japan

[73] Assignee: NEC Corporation, Tokyo, Japan

[21] Appl. No.: 813,164

[22] Filed: Dec. 24, 1985

[30] Foreign Application Priority Data

Dec. 24, 1984 [JP] Japan .................. 59-272432

[51] Int. Cl.$^4$ .................. G02B 26/10; G02B 1/00
[52] U.S. Cl. .................. 350/3.71
[58] Field of Search .................. 350/3.71

[56] References Cited

U.S. PATENT DOCUMENTS 4,333,006  6/1982  Govin et al. .................. 350/3.71
4,378,142  3/1983  Ono .................. 350/3.71

OTHER PUBLICATIONS

Ikeda et al, "Aberration Corrections for a POS Hologram Scanner," Applied Optics, vol. 18, No. 13, Jul. 1979, pp. 2166–2170.
Dickson et al, "Holography in the IBM 3687 Supermarket Scanner," IBM J. Res. Devlop, vol. 26, No. 2, Mar. 1982, pp. 228–234.
Lee, "Holographic Grating Scanners with Aberration Corrections," Applied Optics, vol. 16, No. 5, May 1977, pp. 1392–1399.
Ono et al., "Holographic Laser Scanners Using Generalized Zone Plates," Applied Optics, vol. 21, No. 24, Dec. 1982, pp. 4542-4548

Primary Examiner—Bruce Y. Arnold
Attorney, Agent, or Firm—Sughrue, Mion, Zinn, Macpeak & Seas

[57] ABSTRACT

A laser beam scanner that includes a laser source emitting light at a frequency ($X_2$) and a rotatable hologram produced by interfering lasers at a frequency ($X_1$) and located a distance (a) from the laser source and a scanned surface at a distance (b) from the hologram. The hologram satisfies the image forming relationship $1/F_1 = 1/f_0 + 1/f_R$ where $F_1$ is the focal distance of the hologram and $f_0$ and $f_R$ are the respective distances of the hologram from the divergent and convergent points where the interfering lasers are located. The laser source is located in a position away from the optical axis of the hologram so as to enlarge the diffraction angle. However, in order to compensate for resulting astigmatism, the hologram is produced by selecting the positions of the two interfering lasers in order to satisfy the image formation relationship in a region distant from the hologram optical axis and not to satisfy the image formation relationship on the optical axis.

2 Claims, 2 Drawing Sheets

HOLOGRAPHIC LASER BEAM SCANNER

BACKGROUND OF THE INVENTION

The present invention relates to a laser beam scanner, and more particularly to a laser beam scanner using a hologram for light deflection.

A holographic laser beam scanner utilizes a hologram as a diffraction grating, and achieves light deflection by moving a hologram across an incident laser beam. The hologram has a variable pitch grating which is adapted to vary and thereby varying the diffraction angle of the laser beam. A number of proposals have already been made as to a hologram for use in such a laser beam scanner.

The present inventor devised a hologram which was considerably free of astigmatism, which constituted a problem with prior are holograms, and acquired the U.S. Pat. No. 4,299,437 on a laser beam scanner using that hologram. That invention used a hologram which was produced by interference between a divergent spherical wave and a convergent spherical wave and had on it a phase distribution $\phi(r)$ of interfering light beams represented by the following equation.

$$\phi(r) = \frac{2\pi}{\lambda} [(\sqrt{r^2 + f_0^2} - f_0) + (\sqrt{r_2 + f_R^2} - f_R)] \quad (1)$$

In a disk type laser beam scanner a hologram disk, on whose periphery is arranged such a hologram, is rotated to move the hologram across an incident laser beam. In such scanner it is advantageous to increase the locus length of the scanning laser beam on the scanned surface relative to the locus length of the incident laser beam on the disk, i.e. the scanning magnification. To this end the diffraction angle $\theta_d$ of the hologram is designed to be as great as practicable. The calculations of the scanning magnification, will be explained below with reference to FIG. 1. In the figure, an incident laser beam 32 strikes a hologram disk 33 and is diffracted as a scanning laser beam 35, which draws a line 36 as the hologram disk 33 rotates. The rotational radius $R_F$ of the scanning beam on the focal plane containing the focus 37 of the hologram, separated from the hologram by the focal distance F of the hologram, is represented by Equation (2) below:

$$R_F = F \cdot \tan \theta_d + R \quad (2)$$

where $\theta_d$ is the diffraction angle of the scanning beam when it comes to the center of the scanning line, and R, the disk radius in the striking position of the incident beam 32. The scanning length $l_p$ on the scanning surface is represented by Equation (3) below:

$$l_p = R_F \cdot \theta_r \cdot L/F \quad (3)$$

where L is the distance between the hologram and the scanning surface and $\theta_r$ is the rotational angle of the disk. Meanwhile, since the locus length h of the incident beam on the hologram when the disk has rotated by $\theta_r$ is $$h = R \cdot \theta_r \quad (4)$$

the scanning magnification M is represented by $$M = L \left( \frac{\tan \theta_d}{R} + \frac{1}{F} \right) \quad (5)$$

on the basis of Equations (2), (3) and (4). Equation (5) reveals that as the diffraction angle $\theta_d$ becomes larger, the the scanning magnification becomes larger. Thus, if the diffraction angle $\theta_d$ is set greater, a sufficiently long scanning line can be obtained even though the rotational angle of the disk is small. Therefore, it is advantageous to set the diffraction angle $\theta_d$ greater in designing the hologram disk. However, for the hologram disclosed in the aforementioned U.S. Pat. No. 4,299,437, though the beam is imaged on the scanned surface within the diffraction angle range of 0° to 30°, it is subject to a conspicuous astigmatism when the diffraction angle $\theta_d$ is greater than 30°. If the diffraction angle $\theta_d$ is limited to this maximum angle, there is a corresponding restriction on the scanning length of the light beam scanner.

SUMMARY OF THE INVENTION

An object of the invention, therefore, is to provide a laser beam scanner affording a great scanning length relative to the rotational angle of the disk.

According to the invention, there is provided a laser beam scanner wherein a laser beam strikes on a moving hologram and a scanning laser beam is generated to scan a surface away from the hologram by a prescribed distance, comprising: laser beam generating means for generating a laser beam of a spherical wave; a hologram disk on which a hologram is recorded; and means for so moving the hologram disk as to cross the laser beam, wherein (i) the hologram records an interfering fringe pattern satisfying the equation of $$\frac{2\pi}{\lambda_1} [(\sqrt{r_n^2 + f_0^2} - f_0) + (\sqrt{r_n^2 + f_R^2} - f_R)] = 2\pi n$$

where $f_0$ is the distance between the diverging point of a divergent spherical wave for producing a hologram and the hologram; $f_R$, the distance between the converging point of a convergent spherical wave for producing a hologram and the hologram; $\lambda_1$, the wavelength of the divergent spherical wave and convergent spherical wave; n, an integer; and $r_n$, the radius of an interfering fringe having its center at the intersection between a straight line connecting the diverging and converging points and the hologram; and, (ii) when the light beam having a wavelength $\lambda_2$, which is longer than the wavelength $\lambda_1$, strikes on said hologram, it will fail to satisfy the image formation relationship on the scanned surface on the optical axis ($r_0=0$) of the hologram, but it will satisfy the image formation relationship on the scanned surface in a region distant from the vicinity of the optical axis. This hologram permits selective determination of said $f_0$ and $F_R$.

DETAILED DESCRIPTION OF THE PREFERRED EMBODIMENT

A description of the characteristics of a hologram used in the U.S. Pat. No. 4,299,437, before describing the preferred embodiment of the present invention, would facilitate understanding of this invention.

Figure 1:
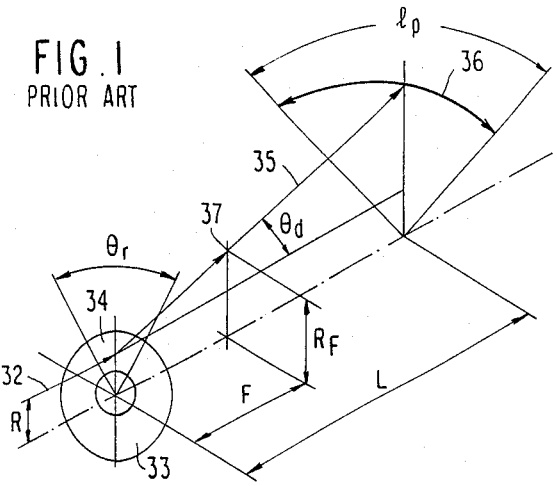
FIG. 1 shows an oblique view of the optical arrangement of the hologram disk and the scanned surface.
Figure 2:
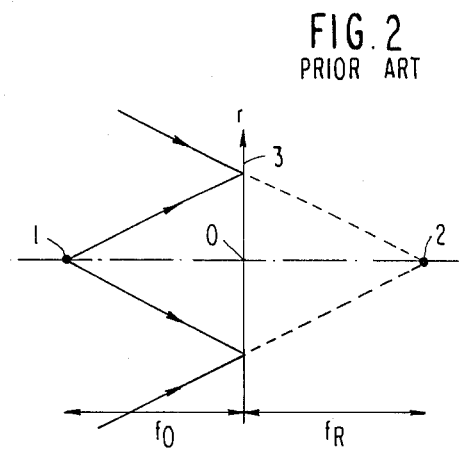
FIG. 2 shows a plan of the optical arrangement of a light source for interference and a photosensitive plate when a hologram is produced.

FIG. 2 illustrates an optical system for producing a hologram for use in the present invention. Referring to the figure, an interfering fringe of a divergent spherical wave diverging from point 1 and a convergent spherical wave converging on point 2 is recorded on a photosensitive body. The phase difference distribution here is represented by the following equation:

$$\phi(r) = \frac{2\pi}{\lambda_1} [(\sqrt{r^2 + f_0^2} - f_0) + (\sqrt{r^2 + f_R^2} - f_R^2)] \quad (6)$$

wherein $\lambda_1$ is the wavelength of the interfering light beams; $f_0$, the distance between the hologram surface and the diverging point of the divergent spherical wave, which is an interfering light beam; $f_R$, that between the hologram surface and the converging point of the convergent spherical wave, which is another interfering light beam; and r, a coordinate whose origin is the intersection between a straight line connecting the diverging and converging points and the hologram surface, this coordinate being on the hologram surface. By assuming $\phi(r)$ to be equal to $2\pi n$ (n is an integer representing the order of interference), the radius of the interfering fringe can be calculated.

The focal distance of the hologram produced in the above described optical system with a wavelength $\lambda_1$ is represented by $$1/F_1 = 1/f_0 + 1/f_R \quad (7)$$

where $f_0$ and $f_R$ are the distances of the hologram from the divergent and convergent points, respectively, of the spherical waves. If a light beam having a wavelength $\lambda_2$ is used for the laser beam scanner, the focal distance $F_2$ of the hologram then will be $$F_2 = F_1 \times \lambda_1 / \lambda_2 \quad (8)$$

Figure 3:
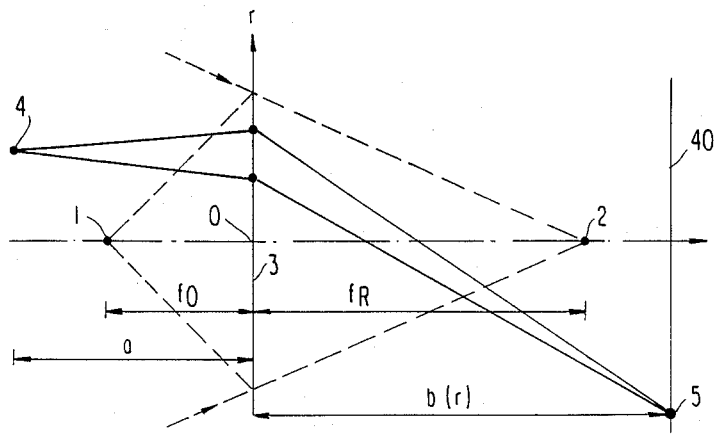
FIG. 3 is a plan illustrating the relationship of the incident light beam to the hologram produced as shown in FIG. 2.

Now will be described, with reference to FIG. 3, the image formation relationship which is present where a spherical wave emitted from a diverging point 4 comes incident on a hologram produced as described above. In the figure, dotted lines represent laser beams used when the hologram was produced, and solid lines, laser beams used for the laser beam scanner. When used for the laser beam scanner, the spherical wave divergent from the diverging point 4 enters the hologram 3. In this arrangement, the U.S. Pat. No. 4,299,437 so sets the incident distance a of the laser beam onto the hologram, or the distance between the diverging point 4 and the hologram, the converging distance b(0) of the diffraction beam, or the image formation distance on the optical axis, at r=0, both with reference to FIG. 2, and $F_2$ as to satisfy the relationship of $$1/a + 1/b(0) = 1/F_2 \quad (9)$$

Figure 4:
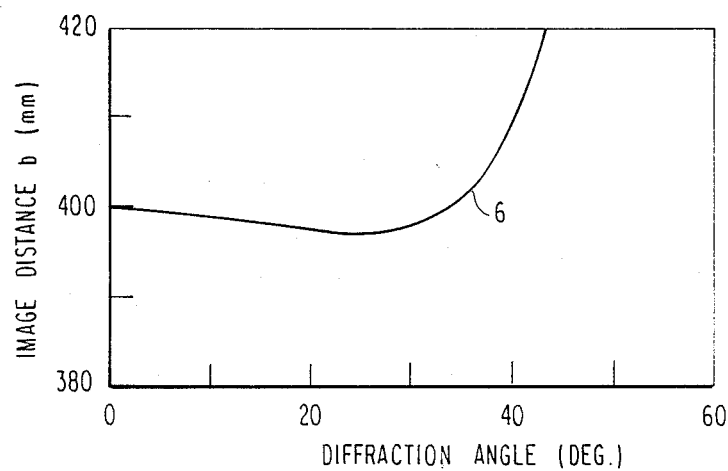
FIG. 4 is a curve showing the relationship between the diffraction angle and the image formation distance of a hologram by the prior art.

Thus, the hologram 3 is used as a lens to satisfy the image formation relationship on the optical axis of the hologram 3. This results in the problem that, though the aberration is corrected from the diffraction angle of 0°, it is not corrected in the region of higher diffraction angles. Curve 6 in FIG. 4, for instance, represents the image formation distance $b(\theta_d)$ calculated for a diffraction angle $\theta_d$ in an arrangement satisfying the image formation relationship of Equation (9). The hologram here is produced with an a He-Cd laser having a wavelength $\lambda_1$ of 441.6 nm, and an He-Ne laser having a wavelength $\lambda_2$ of 632.8 nm is used as scanning beam. If the image formation distance b(0) on the optical axis on the scanned surface is set at 400 mm and the focal distance $F_2$ of the hologram to be used, at 100 mm, the distance a of the divergent point 4 of the scanning laser from the hologram will be determined at 133.3 mm. If the distances $f_0$ and $f_R$ of the light diverging and converging points 1 and 2, respectively, are so selected in hologram production as to satisfy Equation (7) in different ways, various holograms having a focal distance of 100 mm can be obtained and, depending on the choice of $f_0$ and $f_R$, the aberration can be corrected in the optical manner. Curve 6 represents an instance in which the aberration can be optically corrected over a wide range of diffraction angle, and $f_0$ and $f_R$ at this time are 660 mm and 183.04 mm, respectively. At a diffraction angle of over 30°, the aberration will increase, and anywhere beyond 40°, no image will be formed on the desired scanned surface.

The present invention, on the other hand, uses a hologram on whose optical axis no image formation relationship is satisfied on the scanned surface. Thus, if a hologram having a focal distance $F_2$ is used, with distances a and b from the hologram being set for the diverging point 4 and the scanned surface, respectively, the following equation will be satisfied and an image formed on the scanned surface in a region distant by r from the optical axis:

$$\frac{1}{a} + \frac{1}{b(r)} = \frac{1}{F_2} \quad (10)$$

but the following inequality will be satisfied on the optical axis:

$$\frac{1}{a} + \frac{1}{b(0)} < 1/F_2 \quad (11)$$

From Equation (10) and Inequality (11), the following relationship holds:

$$b(0) > b(r) = b \quad (12)$$

Thus, though an image is formed on the scanned surface in a position away from the optical axis, image formation on the optical axis takes place farther than the scanned surface, resulting in an astigmatism. However, since it is more advantageous for a holographic disk laser scanner to position laser irradiation off the optical axis of the hologram so as to enlarge the diffraction angle, if the laser beam incidence is positioned where the diffraction angle is wide enough, deviation of the image formation position from the scanned surface would pose no problem in the vicinity of the optical axis. Therefore, according to the present invention, $f_0$ and $f_R$ are so selected as to satisfy the image formation relationship in a region away from the optical axis.

Figure 5:
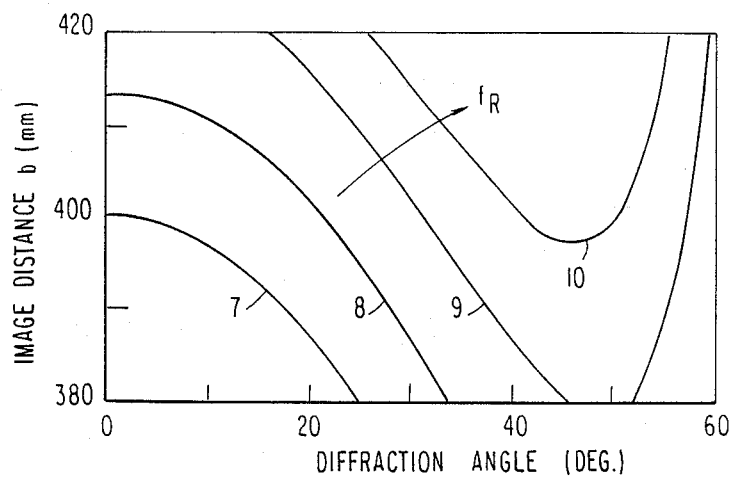
FIG. 5 is a sequence of curves for describing, how to correct aberration of the hologram for use in the present invention.

FIG. 5 shows, with a view to describing aberration correction according to the invention, a set of curves representing calculations of the image formation distance $b(\theta_d)$ of the diffraction beam relative to the diffraction angle. The image formation distance in every case is supposed to be 400 mm from the hologram, that is, on the scanned surface. The aberration characteristic where $f_0$ is set shorter than the distance of the diverging point for the curve of FIG. 4, i.e. where $f_0=550$ mm and $f_R=193.79$ mm, is represented by curve 7, which indicates that the image formation distance decreases from 400 mm with an increase in diffraction angle, resulting in a state of over-correction.

Next, the aberration characteristic where $f_0$ is fixed at 550 mm and $f_R$ is extended to make the focal distance $F_2$ longer than 100 mm is represented by curves 8, 9 and 10. Curve 8 supposes $f_0=550$ mm and $f_R=196$ mm; curve 9, $f_0=550$ mm and $f_R=198$ mm, and curve 10, $f_0=550$ mm and $f_R=199.5$ mm. Curve 10 is corrected in the vicinity of a diffraction angle of 48° to an image formation distance b(46°) of 400 mm. Thus the present invention uses for laser beam scanning a hologram whose image formation at a prescribed distance on the scanned surface, as represented by curve 10, is achieved where the diffraction angle is at its possible maximum.

Whereas the hologram described above is an instance in which $f_0$ is fixed at 550 mm and $f_R$ is increased to extend $F_2$ as well, the aberration characteristic can be figured out for various combinations of $f_0$ and $f_R$.

Figure 6:
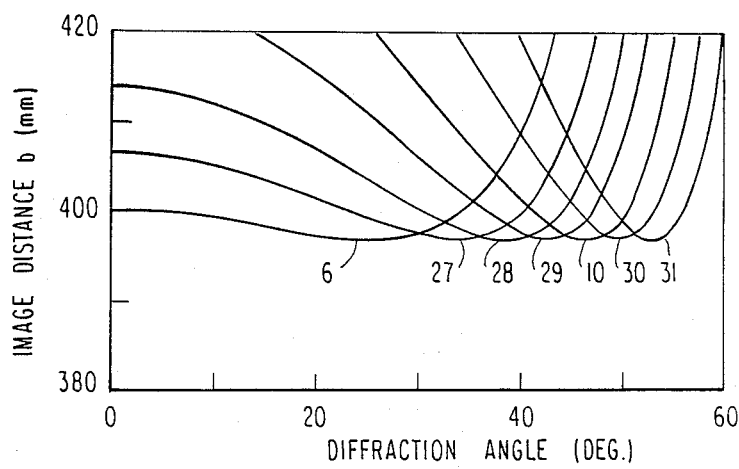
FIG. 6 is a set of curves showing the relationship between the diffraction angle and the image formation distance of the hologram for use in the present invention, wherein the curve shown in FIG. 4 is also represented.

FIG. 6 shows the relationship between the image formation distance $b(\theta_d)$ and the diffraction angle for different combinations of $f_0$ and $f_R$. For every combination, the scanned surface is 400 mm away from the hologram surface. Curve 27 supposes $f_0=625$ mm and $f_R=186.9$ mm; curve 28, $f_0=600$ mm and $f_R=190.35$ mm; curve 29, $f_0=575$ mm and $f_R=194.5$ mm; curve 30, $f_0=525$ and $f_R=205.45$ mm, and curve 31, $f_0=500$ mm and $f_R=212.45$ mm. In this figure is also shown curve 10 ($f_0=550$ mm, $f_R=119.5$ mm) given in FIG. 5, together with the characteristic of the prior art hologram shown in FIG. 3, here as curve 6.

Curve 6 represents aberration correction so achieved as to keep the image formation distance substantially constant within the diffraction angle range of 0° to 30°. In contrast, for other curves, the aberration is well corrected on the scanned surface only within a relatively limited region where the diffraction angle is greater. As the positional relationship between the incident beam and the optical axis of the hologram in a holographic laser scanner is so determined as to maximize the diffraction angle with a view to extending the scanning line length as well, the present invention features the use of a hologram whose aberration is corrected at that diffraction angle.

Figure 7:
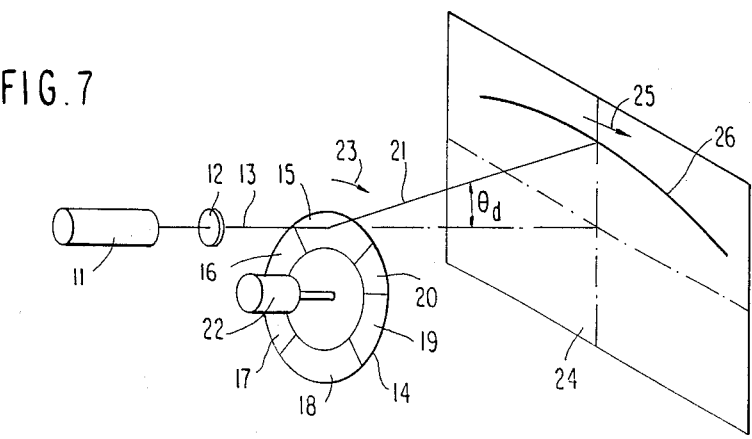
FIG. 7 shows an oblique view of a holographic laser scanner which is one preferred embodiment of the present invention.

FIG. 7 illustrates a preferred embodiment of the present invention, wherein reference numeral 14 represents a hologram disk rotated by a motor 22. On the hologram disk 14 is arranged in each of sectors 15 to 20 a hologram so recorded that the optical axis of the hologram at the time of its production be positioned at a distance farther in the radial direction than the circumference of the disk, or that the focus of the hologram be positioned outside the circumference of the disk. An He-Ne laser 11 together with a lens 12 generates a light beam 13 of a spherical wave whose spread is limited, and strikes the hologram sector 15 on the disk, which produces a diffracted light beam 21 in the direction of a diffraction angle $\theta_d$. A scanning line 26 is drawn on a scanned surface 24 as the disk is rotated in the direction of the arrow. The hologram sections 15 to 20 are successively struck by the laser beam as the motor 22 rotates the disk, and scanning lines are generated repeatedly. The hologram for use in this embodiment may be one having an aberration characteristic represented by any of curves 10 and 27 to 31 in FIG. 6. Therefore, the hologram is produced by selecting the positions of the diverging point 1 and converging point 2 and determining the surface of the spherical such that the image is formed farther than the scanned surface by a laser beam incident on the vicinity of the optical axis of the hologram and on the scanned surface by a laser beam incident at a distance from the vicinity of the optical axis of the hologram.

What is claimed is:

1. A laser beam scanner wherein a light beam impinges on a moving hologram which generates a scanning laser beam to scan a surface located from said hologram at a prescribed distance, comprising:
laser beam generating means for generating a laser beam having a spherical wave;
a hologram disk on which a hologram is recorded; and means for so moving said hologram disk across said laser beam, wherein
said hologram records an interfering fringe pattern satisfying the equation of $$\frac{2\pi}{\lambda_1}[(\sqrt{r_n^2 + f_0^2} - f_0) + (\sqrt{r_n^2 + f_R^2} - f_R)] = 2\pi n$$

where $f_0$ is the distance between the diverging point of a divergent spherical wave for producing a hologram and said hologram; $f_R$ is the distance between the converging point of a convergent spherical wave for producing a hologram and said hologram; $\lambda_1$ is the wavelength of said divergent spherical wave and convergent spherical wave; n is an integer; and $r_n$ is the radius of an interfering fringe having its center at the intersection between a straight line connecting said diverging and converging points and said hologram; and,
when said laser beam having a wavelength $\lambda_2$, which is longer than said wavelength $\lambda_1$, impinges on said hologram, said $f_o$ and $f_R$ are selected so that said laser beam fails to satisfy the image formation relationship on said scanned surface on the optical axis ($r_0=0$) of said hologram, while it does satisfy the image formation relationship on said scanned surface in a region distant from the vicinity of said optical axis.

2. A laser beam scanner comprising:

a laser beam generating means for generating a first laser beam having a spherical wave;

a hologram disk in which at least one hologram image is recorded, said hologram having an optical axis at which the diffraction angle is zero, said hologram being produced by interfering laser beams directed from and to a divergent and a convergent point, respectively, and said hologram satisfying the image forming relationship $1/F_1 = 1/f_0 + 1/f_R$ where $F_1$ is the focal distance of the hologram and $f_0$ and $f_R$ are the respective distances of the hologram from the divergent and convergent points;

means for moving said hologram disk across said first laser beam whereby said beam is scanned along a locus of points defined by the convergence of a laser beam on the predetermined scan surface; the improvement comprising:

said hologram image being produced by selecting the respective positions of said interfering lasers in order to satisfy the image forming relationship on the predetermined scan surface in a region distant from said hologram optical axis, at which the diffraction angle is greater than zero, and not to satisfy the image forming relationship on said optical axis where the diffraction angle is zero.

* * * * *